1,984,440

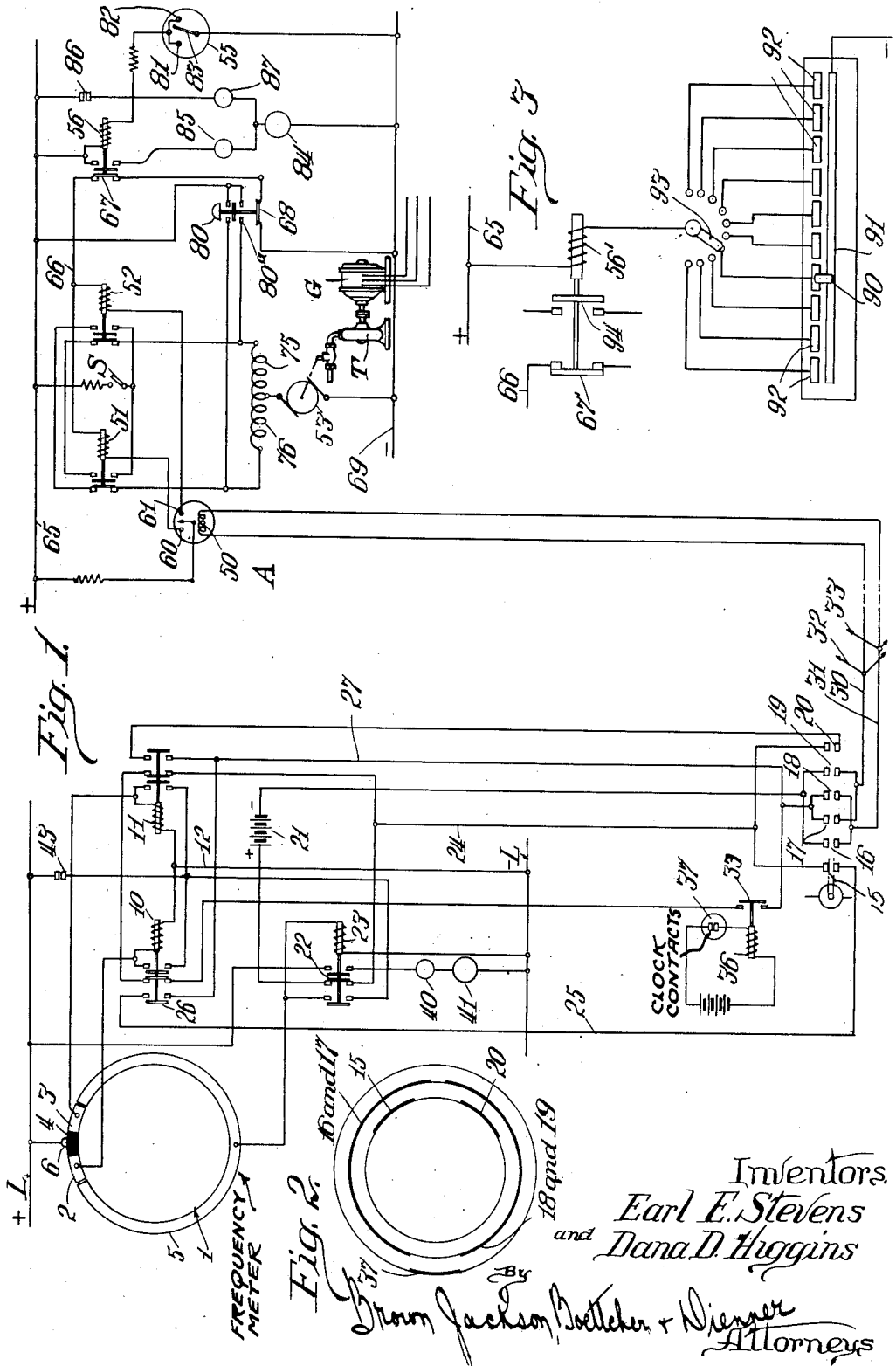

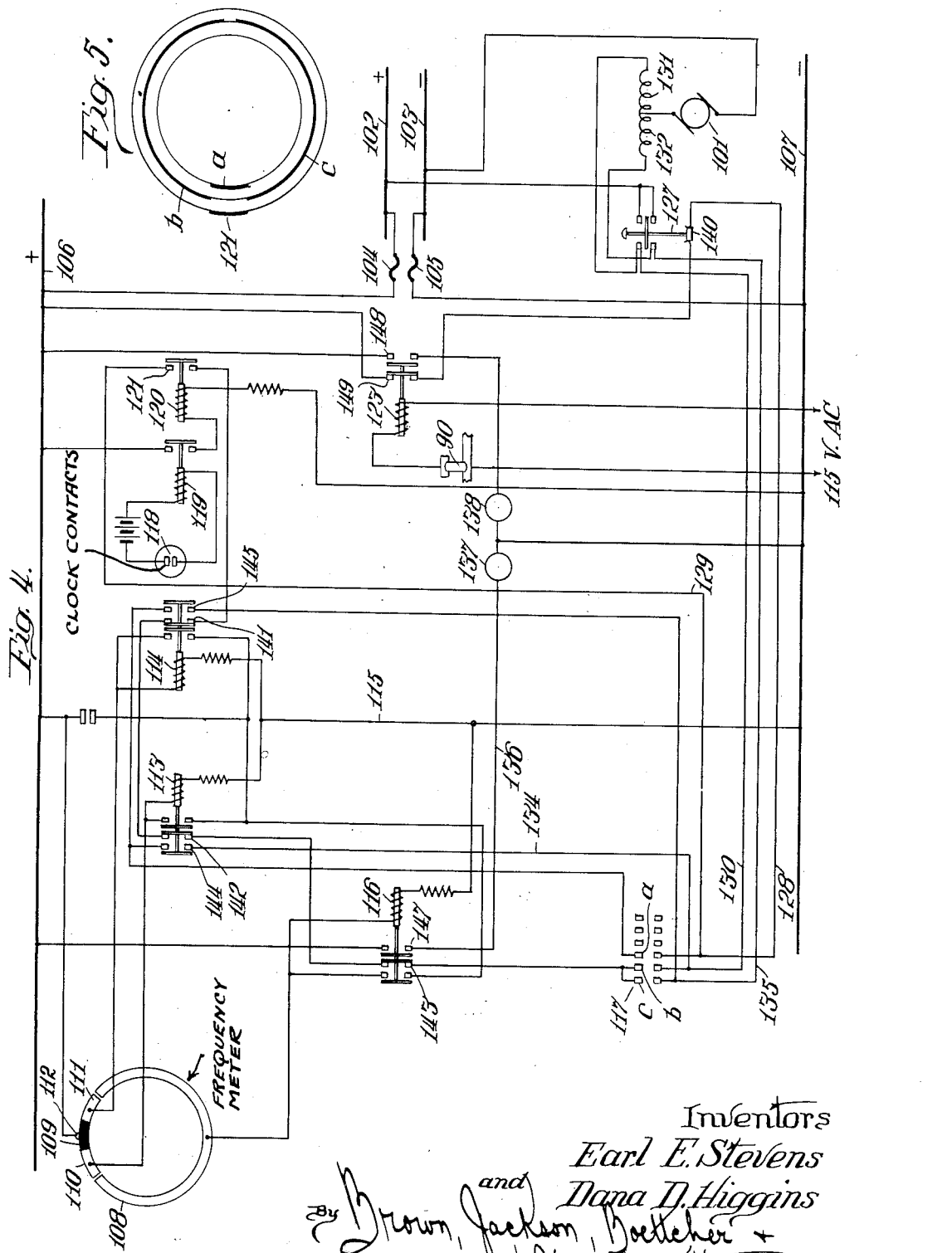
Dec. 18, 1934.  E. E. STEVENS ET AL  1,984,440
AUTOMATIC FREQUENCY CONTROL SYSTEM
Filed March 29, 1929   2 Sheets-Sheet 2
Inventors
Earl E. Stevens
and Dana D. Higgins
By Brown, Jackson, Boettcher & Dienner Attorneys Patented Dec. 18, 1934

UNITED STATES PATENT OFFICE 1,984,440

AUTOMATIC FREQUENCY CONTROL SYSTEM

Earl E. Stevens, Elmhurst, and Dana D. Higgins, Chicago, Ill.

Application March 29, 1929, Serial No. 351,085

26 Claims. (Cl. 171—119)

This invention appertains to means for automatically controlling the frequency of an alternating current system, and it is an object of the present invention to provide control means for maintaining the average value of the line frequency integrated over a period of time, the same as the standard value of the frequency.

The importance of maintaining a system frequency within close limits to the standard frequency of the system is emphasized by the ever increasing number and size of generator units that are at the present time being interconnected into single net works. As the size of the system increases, good frequency regulation becomes more important. System stability, due to the absence of load swings, is more nearly assured if the frequency is maintained at a thoroughly uniform value.

On the other hand, good frequency regulation may be maintained, but if the average and standard values are not exactly coincident, that is, the time-frequency integration is incorrect, any connected synchronous apparatus for the purpose of determining time may show an appreciable error. For example, consider an average frequency of only one tenth of one percent lower than a standard value. In a single day all time pieces whose rate is dependent on this frequency would lose nearly 1.5 minutes.

It is the object of the present invention to provide a device which functions automatically to maintain the frequency, within narrow limits, at a standard value and which checks the integral of frequency, with respect to time, periodically. If the total number of cycles during an interval between two tests differs from the product of the standard frequency and the time interval this is automatically corrected. As a result of this arrangement, if the line frequency differs from the standard by such a small amount that the apparatus does not correct it instantly due to the fact that the frequency responsive apparatus is not sensitive to such small deviations, the error will nevertheless be corrected when the cumulative error in the number of cycles over a period of time reaches a certain value.

The functioning of the control system may be divided into two distinct factors each independent of the other. First, one which causes a variation in the driving power of the generator so that the frequency of the system will not drift far from the standard value, and second, that which in the same manner causes the average and standard frequency to be equivalent.

It is a further object of the present invention to provide a system of the above character wherein the major part of the apparatus may be installed in one station which may be termed the control center and each of the stations wherein the frequency is to be regulated may be provided with a simple assembly of parts, under the control of the apparatus at the control center, for regulating the frequency. The apparatus at the control center consists of a contact making clock and a group of contacts controlled by a synchronous motor. If the frequency of the system varies from the standard frequency by even the smallest amount, the synchronous motor contacts and the clock contacts which are normally actuated alternately will come into phase and, when the difference reaches a certain amount, they will actuate one of two relays at each of the remote stations where the frequency is to be regulated, thereby actuating suitable apparatus to correct the error. If the frequency of the system deviates from the standard frequency by more than about $\frac{1}{2}$ of 1%, the relays at the controlled stations are actuated periodically, as controlled by the clock and a frequency meter at the central station.

In accordance with the present invention, one or more of the generating stations in a large generating system may be provided with the automatic frequency control under the control of the single central station. The number of stations whose frequency is automatically controlled would be determined primarily by the size of the system and the relative sizes of the generating units. It is, of course, understood that, if desired, all of the stations in the system may be regulated from the central point although this is generally not necessary since by controlling the output of a few of the generating units, the frequency of the system may be maintained as desired.

It is a further object of the present invention to provide the controlled stations of the system with contact making watt meters so that if the power output of the generating unit exceeds a predetermined amount, or falls below a different predetermined amount the automatic control as automatically cut out. The generators at each of the stations may be controlled by hand in the usual manner.

The attainment of the above and further objects of the present invention will be apparent from the following specification taken in conjunction with the accompanying drawings forming a part thereof. In the drawings Fig. 1 is a circuit diagram of the control system; Fig. 2 shows the time relationship of the closure of the contacts operated by the synchronous motor and by the clock respectively; Fig. 3 shows a modified form of watt meter contact device; and Figs. 4 and 5 correspond to Figs. 1 and 2 and show a modified form of our invention.

In the drawings 1 represents a contactor disc which is operated by a graphic frequency recorder. The contactor disc comprises two conductor segments 2 and 3 separated by an insulator segment 4, and an additional contactor section 5, insulated from the sections 2 and 3. A stationary contact 6 is normally in engagement with the insulator section 4 and when the frequency of the system deviates from the standard frequency the contactor disc is rotated in one direction or the other depending upon whether the system frequency increased or decreased from the standard. In a 60 cycle system the contactor disc will be rotated to bring the section 2 into engagement with the contact 6 when the frequency of the system falls to 59.95 cycles, and the contactor section 3 will be moved into engagement with the contact 6 when the frequency rises above 60.05 cycles per second. A rise or fall of more than .25 cycles per second will bring the contactor section 5 into engagement with the contact 6. These values are of course only approximate and a frequency instrument of any desired degree of sensitiveness may be used. The frequency meter controlled contacts 1, it is assumed, are not actuated if the system frequency deviates by less than .05 cycles per second. Assume now that the contactor 1 has been rotated to bring the contact 2 into engagement with the stationary contact 6. A circuit is thus established for the relay 10 as follows:

From the positive side of the line L through the contact 6 and contact 2, through the winding of the relay 10 and the conductor 12 to the negative side of the line L. This relay remains actuated until the frequency of the system has been brought back to standard as indicated by the section 4 coming under the contact 6.

Six sets of contacts indicated at 15 to 20, inclusive, are periodically closed and opened by a synchronous motor. The sequence of operation of the contact is indicated in Fig. 2. The contacts 16 and 17 are always opened and closed at the same time, and the contacts 18 and 19 are likewise always opened and closed simultaneously. The heavy portions of the circles in Fig. 2 indicate the portion of the revolution of the motor when the respective contacts are closed, and the light portions of the circles indicate the interval during each revolution when the corresponding contacts are opened. The synchronous motor driving the contacts is geared down so that the contact making mechanism makes one revolution per minute when the system is operating at exactly 60 cycles. It is to be noted that the contact 15 is closed during a portion only of the time that the contacts 16 and 17 are closed, and that the contact 20 is closed during only a portion of the time that the contacts 18 and 19 are closed.

With the relay 10 closed, positive battery potential is placed upon the outgoing telephone line 30 whenever the contact 15 closes, the contacts 16 and 17 being always closed when the contact 15 is closed. This positive potential extends as follows: From the positive side of the battery 21, through the back contacts 22 of relay 23, through the conductor 24 and the contacts 15 which are closed, to the conductor 25 and the closed front contact 26 of the relay 10 to the conductor 27, thence down through the closed contacts 17 to the outgoing telephone line 30. At the same time that positive battery potential is being applied to the conductor 30 through the contact 17 and the contacts 15 and 26 as above described, negative potential from the battery 21 is being applied to the conductor 31 through the contact 16.

In case the relay 11 had been actuated, said relay being actuated when the contact 3 comes in engagement with the contact 6, the circuit from the positive side of the battery would have extended through the back contact 22 of the relay 23 as before, thence by way of conductor 24 to the contacts 20 instead of to the contacts 15, thence by way of the now closed right hand front contact of the relay 11 to the conductor 27 as before. It is, however, to be noted that the contact 20 is not closed at the same time that the contacts 16 and 17 are closed but instead is closed at the same time that the contacts 18 and 19 are closed.

Under these conditions, the circuit from the conductor 27 would extend through the closed contact 18 to the telephone line 31, and the circuit from the negative side of the battery would extend through the closed contact 19 to the conductor 30. It is thus apparent that when the relay 10 is actuated, positive potential is applied to the conductor 30 and negative potential to the conductor 31 when the contacts 15, 16 and 17 are closed and no potential is applied to both conductors when the contacts 18, 19 and 20 are closed, whereas when the relay 11 is actuated current of opposite potential is applied to the conductors 30 and 31 when the contacts 18, 19 and 20 are closed and no potential is applied to both conductors when the contacts 15, 16 and 17 are closed.

The telephone conductors 30 and 31 extend to the various stations of the system where the frequency is to be automatically controlled. One line is shown as extending to the station A. A similar line such as 32—33 extends to a different station. The apparatus at each station is the same, and that at the station A only is shown. There are as many lines such as 32—33 extending from the telephone lines 30—31 as there are stations whose frequency is to be automatically regulated from the control center.

The apparatus at each of the controlled stations includes for the most part only a polarized relay 50, a pair of relays 51 and 52 controlled by the polarized relay, a governing motor 53 rotated in one direction or another by the relays 51 and 52 respectively for controlling the speed of the generating equipment in the usual manner, a contact making watt meter 55 and a relay 56 controlled thereby for disabling the automatic equipment. Direct current voltage applied to the winding of the polarized relay 50 causes the relay to close either the contact 60 or the contact 61 depending upon the polarity of the applied voltage.

When positive potential is applied to the conductor 30 and negative potential applied to the conductor 31, as is the case when the relay 10 is actuated and the contacts 15 and 16 and 17 are closed, it may be assumed that the polarized relay is actuated in a direction such as to close the contact 60. A circuit is thus established from the positive line conductor 65 through the contact 60 to the winding of the relay 51, thence by way of the conductor 66 and the back contact 67 of the relay 56, through the back contact 68 of a hand switch to the negative line 69. The relay 51 upon operating establishes a circuit for the motor 53 as follows: Positive bus 65, through the normally closed switch S, through the now closed right hand front contact of the relay 51 and the closed back contact of the relay 52 to the field winding 75 of the motor 53, thence through the armature 53 to the negative bus 69.

The motor is thus caused to rotate in a certain direction. Opposite rotation of the motor is obtained when the relay 52 is actuated responsive to the polarized relay 50 closing the contact 61 instead of 60. The polarized relay 50 closes the contact 61 when negative battery potential is applied to the conductor 30 and positive potential applied to the conductor 31, as is the case when the contacts 18, 19 and 20 are closed during the time when the relay 11 at the control station is closed. The circuit for the motor 53 when the relay 52 is actuated and relay 51 is released extends as follows: From the positive line 65 to the switch S right hand front contact of the relay 52, left hand back contact of the relay 51, through the field winding 76 of the motor 53, thence to the negative line 69 by way of the motor armature. The governing motor controls the steam input to a turbine T driving one of the electric generators indicated by the reference numeral G, and hence by admitting more or less steam to the turbine, the frequency of the system may be pulled up or down as needed. A hand switch 80 is provided for controlling the motor 53 independent of the automatic control exercised by the relays 51 and 52. When the switch 80 is depressed, a circuit is established by way of the contact 80a to the motor 53 through the field winding 75 and if the switch 80 is elevated a similar circuit is established to the motor 53 by way of the field 76, thus rotating the motor in one direction or the other.

When the switch 80 is actuated by being depressed or elevated to rotate the motor in one direction or the other, the contacts 68 of the switch are opened thereby opening the control circuit for the winding of the relays 51 and 52 and during that time incapacitating the automatic control apparatus. This is necessary for if this feature were not provided, then when the switch 80 is actuated to energize one of the field windings of the motor, one or the other of the two relays 51—52 might be energized by the polarized relay 50 to energize the other field winding of the motor. The provision of the contact 68 on the switch 80 prevents such an occurrence.

The relay 56 at its back contacts 67 controls the circuit through the relays 51 and 52 and when the relay 56 is energized the circuit through the relays 51 and 52 is opened and the automatic frequency control is disabled. A watt meter 55 controls the circuit through the relay 56 and for this purpose there is provided a sliding scale having thereon two contacts indicated at 81 and 82 which contacts are adapted to be engaged by a watt meter needle contact 83. If the load on the generator that is controlled by the regulator motor 53 exceeds a certain amount, the needle 83 engages the contact 82 whereas if the load is below a certain amount the needle 83 engages the contact 81.

The contacts 81 and 82 may be located upon a common slidable mounting support which may be secured in any desired location within the range of travel of the watt meter contact 83. In a generator unit of say 10,000 k. w. the distance between the contact 81 and 82 may correspond to 2,000 k. w. and the support on which the contacts are mounted may be moved along the watt meter so that there is a 2,000 k. w. range of control at any desired loading upon the generator unit. This is desirable since at different times of the day, it may be desired to maintain the load upon the generator unit between different maximum and minimum values. When the load on the generator unit exceeds or falls below the values for which the contact making watt meter 55 has been set, the contact 83 establishes a circuit for the relay 56 which upon energizing opens the circuit for the relays 51 and 52 and also establishes a circuit for the alarm 84 and for the signal lamp 85. Frequency limit contacts 86 are likewise provided for establishing a circuit to the signal lamp 87 and to the frequency and power limit alarm 84.

An explanation will now be given of the manner in which the present apparatus functions to maintain the average value of the frequency the same as the standard value. Assume that the frequency of the system varies from the standard frequency by such a small amount that the frequency controlled contacts 2 and 3 are not actuated to establish a circuit for relays 10 or 11.

Under these conditions the correction will be brought about by the contacts 16, 17, 18 and 19 and by the front contact 33 of the relay 36 that is energized for about five seconds out of each minute by the clock controlled contact 37. When the frequency of the system is exactly 60 cycles and when the average of the frequency is exactly the same as the standard frequency, the contact 37 is closed during the interval of each minute when both the contacts 16 and 17 and the contacts 18 and 19 are open. If, however, the frequency of the system deviates from the standard frequency by even the smallest possible amount, the error in the number of cycles over a period of time becomes cumulative and when the accumulated error has reached a certain amount the contacts 16 and 17 or the contacts 18 and 19 will be closed at the same time that the contact 37 is closed. If the frequency of the system is above standard, then one of those two sets of contacts will be closed simultaneous with the closure of the contact 37 and if the frequency is below standard, then the closure of the other set of contacts will overlap the closure of the contact 37. When the contact 37 closes resulting in the closure of the contact 33, positive potential from the battery 21 is applied to the contacts 17 and 18 as follows: From the positive side of the battery 21 through the back contact 22 of the relay 23, through the middle back contact of the relay 11, and the middle back contact of the relay 10, both of those relays being deenergized, through the closed contact 33 of the relay 36 to the contacts 17 and 18. At the same time the negative potential is applied from the battery 21 to the contacts 16 and 19. It is thus apparent that if, when the contact 33 is closed, the contacts 16 and 17 also closed then positive potential is applied to the telephone conductor 30 and negative potential is applied to the conductor 31 through the contact 16 whereas if the contacts 18 and 19 are closed during the time that the contact 33 is closed, then the positive battery potential is applied to the telephone conductor 31 and the negative battery potential is applied to the telephone conductor 30. The application of the direct current voltage to the conductors 30 and 31 causes the actuation of the polarized relay to control the generator motor 53 in the manner previously pointed out. This voltage if applied to the conductors 30 and 31 for a short period of time each minute during the closure of the contact 37 will regulate the generator units to bring the average value of the frequency into coincidence with the standard value as indicated by the contacts 16 and 17 and the contacts 18 and 19 being closed in synchronism with the contact 37 and in time relationship as indicated in Figure 2.

It is to be noted that the duration of each control impulse that is controlled by the contacts 37 will be proportionate to the extent of overlap of the arc 37 of Figure 2 with the arc indicating the closure of the contacts 16 and 17 or with the arc indicating the closure of the contacts 18 and 19. The extent of this overlap will be proportionate to the extent of deviation of the average frequency from normal, hence the duration of this control will be proportionate to the accumulated error. It is further to be noted that this control will be in impulses which are of very short duration in comparison with the time interval between impulses.

It is to be noted that the control circuit extending through the contacts 33 is opened upon the operation of the relay 10 or the relay 11. As a result of this arrangement the control by the clock contacts is excluded when the frequency of the system deviates from normal by an amount sufficient to bring the contact 6 into engagement with the segments 2 or 3. As a result of this arrangement the correction in the average frequency must be made at such a rate as not to throw the instantaneous frequency off of normal by an amount in excess of 0.05 cycles per second. Should the control of the average frequency tend to vary the instantaneous frequency by a larger amount it will bring about an operation of one or the other of the relays 10—11 which will operate in the manner previously set forth to bring the instantaneous frequency back towards normal, at the same time opening the circuit controlled by the contacts 33 and thus postponing the correction of the average frequency except in so far as this correction is inherently brought about during the time that the frequency is being returned towards normal.

It is further to be noted that the frequency controlled by the relays 10 and 11 is controlled over circuits extending through the synchronous motor driven contacts 15 and 20, respectively. This means that upon the energization of the relays 10 or 11 the controlling motor 53 will be intermittently operated, the time interval between operations being substantially greater than the duration of the operations. Thus after each operation of the motor 53 there is a time interval for the frequency of the system to become stabilized. If the frequency of the system becomes stabilized at a value still different from the normal frequency the motor 53 will be operated again when the contacts 15 or 20 close. If the system becomes stable at the normal frequency the relays 10 and 11 will be released and the control will therefore be transferred to the clock controlled contact together with the contacts driven by the synchronous motor.

A frequency limit alarm relay 23 is arranged to be energized when the contactor section 5 is moved by the frequency meter into engagement with the contact 6. This, in the system under discussion, is assumed to happen when the frequency deviates from the standard frequency by more than .25 cycles per second, although the instrument 1 may be constructed and regulated to close the circuit for the relay 23, when the frequency deviates from the standard frequency by any other preferred amount. The relay 23 upon energizing establishes a circuit for a signal lamp 40 and for a frequency limit alarm 41, and at its contact 22 opens the circuit from the positive side of the battery 21 thereby cutting out the automatic frequency control.

The contacts 43 are contacts arranged to be operated by the frequency meter 1, the arrangement being such that the contacts 43 are closed whenever the contactor section of the frequency meter is in motion and the contacts are open when the contactor segments of the meters come to rest. These contacts are provided merely to prevent arcing between the contactor 6 and the contacts 2, 3 or 5 when the contactor sections are being moved to open the circuit through the contact 6. Arcing would otherwise take place due to the fact that the frequency meter moves its contacts very slowly. By the present arrangement the contact 43 being closed when the frequency meter is in motion, the contacts 2 and 3 are by-passed through the front contacts of relays 10 and 11 during this period, and when the frequency meter contacts come to rest, the contacts 43 open and if at this time the contact 6 is upon the insulator section 4, the circuit through the relay 10 or 11 previously established is opened by the contact 43.

Figure 3 shows a watt meter contact device of a somewhat different form from that shown at 55 in Figure 1. In this construction a sliding contact 90 is driven by a watt meter recording mechanism that records the load on the generator unit controlled by the governing motor 53. The contact 90 establishes a circuit between the contact 91 and any one of the ten contacts 92 depending upon its position. A load range selector switch 93 is provided to connect the relay 56' to any one of the ten contacts 92. As long as the contact 90 is in engagement with the particular contact 92 that has been selected by the selector switch 93 the relay 56', which corresponds to the relay 56 of Figure 1, is energized and closes its front contacts 67' and opens its back contacts 94. Should the load on the generator vary by such an amount that the contact 90 is moved off of the particular contact 92 that has been selected by the switch 93, the relay 56 deenergizes and opens the contacts 67' and closes the contacts 94. The contacts 67' control the circuit for the relays 51 and 52 over the circuit shown in Figure 1, and the contacts 94 control the circuit for the signal light 85 and the frequency and power limit alarm 84. During different times of the day the selector switch 93 is moved to different positions to engage the particular contacts 92 corresponding to the range within which the generator load is to be maintained. While ten contacts 92 have been shown, it is of course understood that a greater or lesser number may be provided as desired.

When an automatic frequency control device, such as herein described, is employed to regulate the frequency of a system where the generating stations may at times be isolated from each other or where bus sectionalization may occur, it is advisable to connect a frequency synchronized clock on each bus of each station. In case the stations or busses in a station are separated, the clocks connected to the busses on which there are no generators on automatic control will, by comparison with the standard clock, show the total accumulated error. After restoration of normal operating conditions any clock, connected as just mentioned, could be corrected, if necessary, by again isolating the bus at some low load period and maintaining the frequency off standard value until the time error was cancelled.

Referring now to Figure 4 which illustrates a modified form of the system employed with the complete frequency regulator located in the same station as the generator or generators to be controlled. The numeral 101 represents the governor motor for controlling the generator and thereby the frequency. Power for operating this motor and the frequency control mechanism is obtained from an operating bus the positive side of which is numbered 102 and the negative side 103. Connections are made from this bus through the fuses 104 and 105 to the frequency control buses 106 and 107. Contactor disc 108 operated from the frequency recorder in the same manner as disc 1 has thereon the insulated portion 109 of the disc. The contactor 112 is connected to the positive side 106 of the supply bus. Segments 110 and 111 are connected as in Figure 1 to relays 113 and 114 and circuit is completed through these relay-windings and conductor 115 to the negative side 107 of the frequency control bus.

From the above description it will be seen that when the contactor 112 engages with segment 110, relay 113 will be energized and when the contactor 112 engages the segment 111, relay 114 will be energized. Relay 116 is energized when the contactor 112 engages the main portion of the disc 108.

The synchronous motor driven contactor indicated generally by the numeral 117 has contacts $a$, $b$, and $c$ thereon and other contacts are also shown which may be utilized in connecting up another generating unit if desired. The contactor 117 is as in the device shown in Figs. 1 and 2 operated by a synchronous motor which is directly connected in the system the frequency of which is to be controlled so that the speed of rotation of the contactor 117 will be proportionate to the frequency of the system, suitable speed reducing gearing being interposed so that when the frequency is normal, say 60 cycles per second, the synchronous motor driving the contacts will make one revolution per minute.

A master contact making clock controls the contacts 118 in the same manner as contacts 37 are controlled in the main form of the device, to energize the relay winding 119 for short periods of time, which may be about five seconds at intervals of one minute, and thereby close the circuit for relay 120 which in turn connects contacts 121 to complete a control circuit which will be hereinafter more fully described. The contact making graphic watt meter contact 90, of the kind shown in Figure 3 is normally in circuit to energize relay 123 but is adapted to break its circuit upon an excessive overload or under-load of the system and completes the apparatus of the frequency control.

Now assuming that the frequency falls below standard value an amount which is too small to move the contactor 112 onto the segment 110 but which at the same time would if continued create an accumulative error in the average frequency of the system as compared to the standard frequency, the contactor device 117 being responsive to this frequency will slow up with the result that contacts $b$ and contacts 121 may be closed at the same time for a short interval. When this occurs, a circuit is completed which extends from positive bus 106 through normally closed contacts of relay 123, normally closed contacts 140 of the hand operated control 127, conductor 128, conductor 129, closed contacts 121, normally closed contacts 141 of relay 114, normally closed contacts 142 of relay 113, normally closed contacts 143 of relay 116, closed contacts $b$ of contactor device 117, conductor 130, winding 131 of motor 101 to negative bus at 103 through motor 101. This energizes the motor 101 to cause it to operate and effect a change in the generating power to increase the frequency.

Similarly, if the frequency should be too high for a period of time so as to cause contacts $c$ of device 117 and contacts 121 to be closed at the same time, winding 132 of motor 101 would be energized to reverse the motor and cause the generating system to decrease its frequency.

If the frequency decreased an amount sufficient to move the contact 112 off of the segment 109 onto the segment 110, relay 113 would be energized to attract its armature and complete a circuit extending from positive bus 106 through normally closed contacts of relay 123, conductor 128 to contacts $a$ of 117 and these contacts upon their periodic closing would continue the circuit through closed contacts 144 of energized relay 113, conductor 134, conductor 130, and winding 131 of motor 101 to negative bus 103 and thus operate the motor to increase the frequency of the system.

Similarly, if the frequency increases to such an extent as to cause contact 112 to engage sector 111, relay 114 will be energized to close its contact 145 and complete a circuit for energizing winding 132 of motor 101 when contacts $a$ of contactor device 117 are closed.

Now when relay 116 is energized by an excessive increase or drop in the frequency bringing contactor 112 into engagement with the disc 108, it attracts its armature to close a circuit at its contacts 147 from positive bus 106, through conductor 136, alarm device 137, to negative bus 107 to thus actuate an alarm showing the abnormal condition. Energization of relay 116 also causes the automatic control to be inoperative by opening the circuit at contacts 143 of this relay.

Also, if the graphic watt meter 122 shows an abnormal overload or under load condition, it breaks the contacts to deenergize relay 123 permitting its armature to restore and close contacts 148 thereof and thereby energize signal device 138 over an obvious path to give the alarm. Deenergization of relay 123 causes the automatic control to be inoperative by opening the circuit at contacts 149 of this relay.

In compliance with the requirements of the patent statutes we have herein shown and described a few preferred embodiments of our invention. It is, however, to be understood that the invention is not limited to the precise embodiments herein shown, the same being merely illustrative. What we consider new and desire to secure by Letters Patent is:

1. The method of controlling the frequency of an alternating current system which comprises periodically measuring the integrated frequency error with respect to the integral of the normal frequency for the same period of time, periodically controlling the frequency to maintain the integrated frequency error at zero, measuring the instantaneous frequency, and periodically controlling the frequency to maintain the instantaneous frequency at normal.

2. The method of controlling the frequency of an alternating current system which comprises, measuring the power output of a generator unit, measuring the frequency of the system, measuring the integrated frequency error periodically, and controlling the power input to the generator in accordance with the frequency error provided the power output of the generator unit lies between prescribed limits.

3. In an alternating current system, two sets of contacts operated respectively responsive to an increase and to a decrease in the frequency of the system from a standard frequency, two sets of contacts operated at a rate which is a function of the frequency of the system, a pair of contacts actuated periodically independent of the frequency of the system, and electro-responsive means for controlling the frequency of the system, said means being actuated responsive to the simultaneous actuation of one of the second mentioned contacts and either one of the first mentioned or the third mentioned contacts.

4. In an alternating current system, a pair of relays, means for actuating one of said relays responsive to an increase in the line frequency and the other relay responsive to a decrease in the line frequency from a standard frequency, separate contacts operated periodically independent of the frequency, intermittently operated contacts operative a predetermined amount per cycle of the system, and frequency controlling means operated by the joint action of said last mentioned contacts and either of the other contacts or the relays.

5. In an alternating current system including a plurality of generating stations, means for controlling the frequency of the system, said means comprising frequency responsive means at a control center, electro-responsive means at one or more of the generating stations and controlled by said frequency responsive means for controlling the frequency of the system, maximum and minimum power output limiting means at the controlled stations under the control of said frequency responsive means, and means responsive to the deviation of the system frequency beyond predetermined limits for rendering said electro-responsive means inoperative.

6. In an alternating current system, a plurality of generating stations, control conductors connecting certain of the stations with a central control station, frequency testing means at the central station, frequency controlling means at each of said certain stations automatically controlled over the control conductors by said frequency testing means, means at each of said controlled stations responsive to an increase in the power output of the station beyond a predetermined limit for disabling the automatic control, and means responsive to deviation of the system frequency beyond predetermined limits for disabling said frequency controlling means.

7. In an alternating current system, a plurality of generating stations, control conductors connecting certain of the stations with a central control station, frequency testing means at the central station, frequency controlling means at each of said certain stations automatically controlled over the control conductors by said frequency testing means, means at each of said controlled stations responsive to a decrease in the power output of the station beyond a predetermined limit for disabling the automatic control, and means responsive to deviation of said system frequency beyond predetermined limits for disabling said frequency controlling means.

8. In combination with an alternating current generator, means for increasing or decreasing the frequency of the generator, manual means for controlling said first means, automatic means for controlling said first means, and means dependent upon the output of the generator for disabling the automatic means, said last means including an element movable over a prescribed path and variable means for selecting any portion of the path and rendering the disabling means ineffective over said portion.

9. In an alternating current system, means moved into a definite position in accordance with the instantaneous value of the frequency of the system, means periodically actuated independent of the instantaneous frequency and dependent upon the time integral of the frequency of the system, and means controlled by both of said means for increasing or decreasing the frequency of the system.

10. In an alternating current system, means for measuring the instantaneous frequency of the system and, periodically, the time integral of the frequency, and electro-responsive means controlled by said means and responsive to the deviation of either the frequency or the integral of the frequency by more than a predetermined amount from a given standard for bringing the frequency and the integral of the frequency back to standard.

11. In an alternating current system, means for periodically measuring the frequency of the system and the time integral of the frequency, electro-responsive means controlled by said means and responsive to the deviation of either the frequency or the integral of the frequency by more than a predetermined amount from a given standard for bringing the frequency and the integral of the frequency back to standard, and means effective responsive to the deviation of the frequency beyond predetermined limits for disabling said electro-responsive means.

12. An alternating current power system including controlling apparatus comprising two sets of contacts, continuously driven means controlling one of said sets of contacts in accordance with the frequency of the system, a clock mechanism controlling the other set of contacts, a control circuit, and electro-responsive means actuated over said control circuit responsive to a predetermined phase displacement between said sets of contacts, said electro-responsive means being differently controlled over the same circuit depending upon the direction of the phase displacement with reference to one of the sets of contacts.

13. In an alternating current system, means positioned in accordance with the time integral of the frequency for varying the frequency to maintain the average frequency constant, and means controlled in accordance with the instantaneous frequency for limiting the extent to which the first mentioned means may vary the frequency to correct an error in the average of the frequency.

14. In an alternating current system, a set of contacts, means driven in synchronism with the system frequency for opening and closing the contacts, a second set of contacts, means for controlling said second set of contacts responsive to a deviation in the instantaneous frequency of the system, said last named means limiting the extent to which the first-mentioned means may vary the frequency to correct an error in the average of the frequency of said system, and means controlled by the joint action of both sets of contacts for controlling the frequency of the system.

15. In an alternating current system, means for regulating the frequency of the system, means dependent upon the instantaneous frequency and independent of the time integral of the frequency for controlling said means, means dependent upon the time integral of the frequency for controlling said first means, a control circuit over which both of said two last named means control the first named means, and means for preventing simultaneous control by both of said two last named means.

16. In an alternating current system, means for maintaining the average frequency constant, a frequency meter, and means controlled by the frequency meter for postponing the action of the first named means responsive to a predetermined deviation of the instantaneous frequency from normal.

17. In an alternating current system, means including a control circuit for maintaining the average frequency constant, a frequency meter sensitive to deviation in frequency in excess of a predetermined amount, and means controlled by the frequency meter responsive to a deviation in frequency in excess of said predetermined amount for effecting a correction of the frequency and for postponing the action of said first named means, said last named means including said control circuit.

18. In an alternating current system, means including frequency responsive device for regulating the frequency, means for regulating the time integral of the frequency, and means for excluding the regulating action of one of said means during the regulation of the other of said means.

19. In an alternating current system, means responsive to a predetermined deviation of the frequency from a standard value, means controlled by said responsive means for regulating the frequency, means for regulating the time integral of the frequency, and means controlled by said first named responsive means for excluding the time integral regulation.

20. In an alternating current system, a frequency controlling circuit, means controlled responsive to deviations of the frequency of the system for periodically sending impulses of current over said circuit, the duration of each impulse being a fractional portion of the time interval between impulses, means controlled by the deviation of the average frequency for sending impulses of current over said circuit, the duration of the last mentioned impulses varying in proportion to the extent of the deviation in the average of the frequency, means controlled by the first named means for postponing the sending of impulses by the last named means, and means controlled by the impulses for regulating the frequency.

21. In an alternating current system, an electro responsive device operated responsive to a predetermined deviation of the frequency of the system from normal and maintained operated as long as the deviation exists, and frequency controlling means, and means periodically placing the controlling means under control of said device.

22. In an alternating current system, an electroresponsive device operated responsive to a predetermined deviation of the frequency of the system from normal and maintained operated as long as the deviation exists, frequency controlling means, and means for intermittently placing the controlling means under control of the electro responsive device, the durations of intermittent control being a fractional part of the duration between the control intervals.

23. The method of regulating the frequency of an alternating current system which comprises measuring the integrated frequency, regulating the integrated frequency to maintain it the same as the integral of the normal frequency for the same period, measuring the instantaneous frequency, regulating the frequency when the instantaneous frequency deviates from normal in excess of a predetermined permissible amount and at the same time preventing regulation in accordance with deviation in the time integrals.

24. In an alternating current system including a plurality of generating stations, automatic means for controlling the frequency of the system located at a control center, said means including means positioned in accordance with the instantaneous frequency of the system and means positioned in accordance with the time integral of the system, means at one or more of said generating stations under the control of said means at the control center for controlling the frequency of the system, adjustable means for limiting the amount of power supplied to the system under control of said frequency responsive means, and means responsive to the deviation of the system frequency beyond predetermined limits for disabling the automatic frequency controlling means.

25. In an alternating current system, a first set of contacts, means driven in synchronism with the system frequency for opening and closing the contacts, a second set of contacts, means for controlling said second set of contacts responsive to a deviation in the instantaneous frequency of the system, means controlled by the joint action of both sets of contacts for controlling the frequency of the system, adjustable means for disabling the frequency controlling means responsive to the power output of said system, and means responsive to deviations in the system frequency beyond predetermined limits for disabling said frequency controlling means.

26. The method of controlling the frequency of an alternating current system, which comprises measuring the power output of a generator unit, measuring the integrated frequency of the system, measuring the instantaneous frequency of the system, automatically controlling the power input to the generator in accordance with the frequency error measured, disabling the frequency control upon deviation of said output beyond predetermined limits, and disabling the frequency control upon deviation of the system frequency beyond predetermined limits.

EARL E. STEVENS.
DANA D. HIGGINS.